United States Patent [19]

Maeda

[11] 3,913,561

[45] Oct. 21, 1975

[54] CORRECTING MEASURE DEVICE FOR CEPHALOMETRY

[76] Inventor: Koshi Maeda, 148, Yamazatocho, Showa-ku, Nagoya, Japan

[22] Filed: Dec. 28, 1973

[21] Appl. No.: 429,660

[52] U.S. Cl. .............. 128/2 A; 33/174 D; 128/2 S; 128/361; 250/312
[51] Int. Cl.² .......................................... A61B 6/00
[58] Field of Search .................. 128/2 S, 2 A, 361; 250/312; 33/174 D

[56] References Cited
UNITED STATES PATENTS

| | | | |
|---|---|---|---|
| 1,904,234 | 4/1933 | Hoskin | 250/312 |
| 2,790,084 | 4/1957 | O'Dell | 250/312 |
| 3,812,842 | 5/1974 | Rodriguez | 128/2 A |

*Primary Examiner*—Kyle L. Howell
*Attorney, Agent, or Firm*—Oblon, Fisher, Spivak, McClelland & Maier

[57] ABSTRACT

A device is disclosed which permits simple and accurate cephalometric measurement to be made of the head of a fetus prior to birth in order to allow an accurate determination of whether the head of the fetus can pass through the pelvic cavity. The device includes a first flat plastic scale graduated with lead markings and having a plastic guide connected integrally to the central part of the scale and oriented perpendicular to the scale. A second flat plastic scale, also graduated with lead markings, is mounted to slide freely in the plastic guide to form a cross scale.

1 Claim, 3 Drawing Figures

CORRECTING MEASURE DEVICE FOR CEPHALOMETRY

BACKGROUND OF THE INVENTION

1. Field of the Invention

The present invention relates generally to a correct measuring device for cephalometry, and more particularly to a measuring device for cephalometry for diagnosing accurately whether or not the head of a fetus in case of partus ex vagina can pass through the pelvic cavity.

2. Description of the Prior Art

In some cases, the head of a fetus may not be expulsed at birth in breech presentation, although other parts of the fetus can be expulsed. Therefore to measure the breadth of the head of the fetus before partus is very important. Although measurements of the pelvis by X-ray photography have been carried out for a long time, no reliable apparatus and technique for accurately measuring the head of the fetus has yet been developed.

Up to the present, for diagnosing whether the head of a fetus can pass through the pelvic cavity or not in partus ex vagina, X-ray scale plates graduated with lead-containing paint have been conventionally used by individual physicians and hospitals. However, when such graduated X-ray plates were used, the resulting cephalometric measurements were not sufficiently accurate as to allow an accurate diagnosis of whether or not the head of a fetus would pass through the pelvis in the case of partus ex vagina.

SUMMARY OF THE INVENTION

Accordingly, it is one object of this invention to provide a novel apparatus for use in making cephalometric measurements.

A still further object of this invention is the provision of a novel scale for use in making X-rayy measurements of the head of a fetus.

Briefly, these and other objects of the invention are achieved by providing a first flat plastic scale graduated with lead markings and having a plastic guide mounted integrally with a central portion of the first scale and oreinted perpendicular thereto. A second flat plastic scale, also graduated with lead markings, is positioned in the guide so as to slide freely therein, forming an adjustable cross scale.

BRIEF DESCRIPTION OF THE DRAWINGS

A more complete appreciation of the invention and many of the attendant advantages thereof will be better obtained as the same becomes better understood by reference detailed description when considered in connection with the accompanying drawings, wherein.

DESCRIPTION OF THE PREFERRED EMBODIMENT

Figure 1:
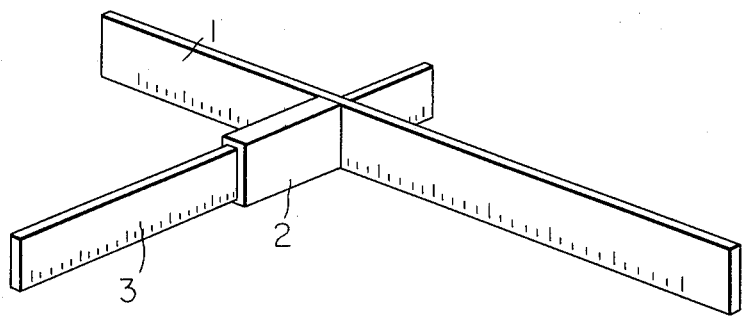
FIG. 1 is a perspective illustration of the preferred embodiment of the present invention.

Referring now to the drawings, wherein like reference numerals designate identical or corresponding parts throughout the several views, and more particularly to FIG. 1 thereof, the present invention is shown including a first flat bar-like plastic scale 1 of dimensions 200 × 30 × 5 mm, approximately, and graduated with lead markings, a plastic guide 2 connected integrally to the central part of the first scale 1 at its flat surface and oriented perpendicularly to the first scale, having a hollow space permitting a second flat bar-like scale to slide freely, and a second flat bar-like scale 3 capable of insertion into and extraction from the hollow space in the guide, and of dimensions 70 × 24 × 5 mm, approximately and also graduated with lead markings. The first and second scales are assembled to form an adjustable cross scale with lead graduations thereon.

Figure 2:
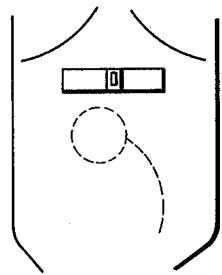
FIG. 2 is a frontal illustration of the present invention showing the manner in which the invention is used.
Figure 3:
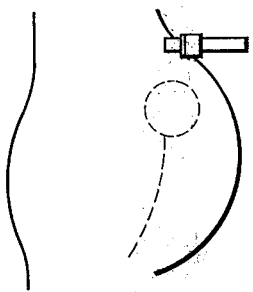
FIG. 3 is a side view of the apparatus as illustrated in FIG. 2.

For diagnosing in case of breech presentation whether or not the head of a fetus can pass through the pelvis, the correct measuring device according to the present invention is to be used as follows. The device is placed at the part of abdomen near the head of the fetus, as shown in FIG. 2, and a simple X-ray photograph is taken of the abdomen from the back. The breadth of the head of the fetus is read from the scale 1. The device is then placed according to the Guthmann method as shown in FIG. 3 to measure the horizontal distance between the scale 1 and the head of the fetus. The horizontal distance is used to correct the breadth of the head read from the scale 1, so that an accurate comparison of the breadth of the head with the breadth of the pelvic cavity is possible. In this manner, the correct measuring device for cephalometry according to the present invention achieves an extremely accurate correction for cephalometry compared with that achieved by the use of conventional X-ray scale plates.

To further explain the use of the present invention, the scale is placed on the abdomen wall in the standing posture near the head of the fetus and two simple X-ray photographs are taken in the direction of the abdomen from the back and in the lateral direction. If the distance between the X-ray tube and an X-ray film is set to 1 m, the distance between the scale and the X-ray tube to $b$, the measurement of the head of the fetus read from the scale on the film to be $a$, and the horizontal distance between the scale and the head of the fetus to be $c$, the correct value of the diameter of the head of the fetus will be given by $a(b-c) \div b$. If $c$ is assumed to be 1 cm, the error in the diameter will be 0.9895 $a$. Therefore there will be an error of over-estimation of about 1 cm when a is 10 cm.

Heads of 40 fetuses in breech presentation, 37 – 39 weeks old, were measured by the present method. After birth they were measured directly. Measurements by the present method and direct measurements after birth were compared to show that measurements by the present method are greater than direct measurements by 0.397 cm in longitudinal diameter, 0.360 cm in transverse diameter and 0.100 cm in distantia obliqua respectively in the mean error.

Although X-ray photography has been used for cephalometry in breech presentation up to the present, correct measurements have been very hard to obtain. The present apparatus and method allows an accurate and simple measurement of the head of a fetus by use of a cross scale according to the present invention, permitting comparison of each diametral value of the head of the fetus with that of the pelvis.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A correct measuring device for cephalometry comprising:

a first bar-like plastic scale having a flat surface graudated with lead markings on said flat surface, a plastic guide connected integrally with a central portion of said first scale, said guide extending outwardly from said flat surface and including an aperture oriented perpendicularly with respect to said flat surface of said first scale; and a second bar-like plastic scale having a flat surface graduated with lead markings, and freely slidably mounted within said aperture in a plane perpendicular to that of said flat surface of said first scale.

* * * * *